March 3, 1970 E. SIDDALL 3,498,881
APPARATUS FOR NUCLEAR REACTOR CONTROL
Filed May 29, 1967
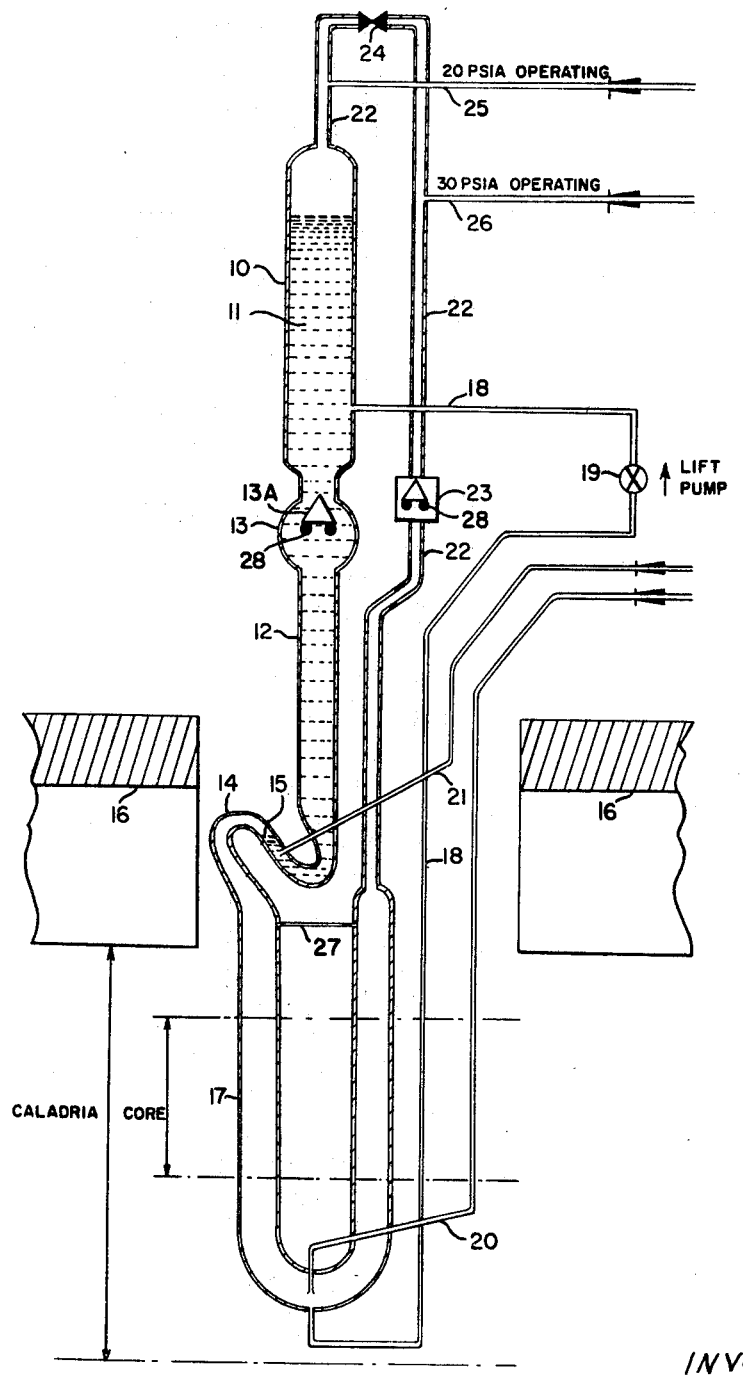
INVENTOR
ERNEST SIDDALL
By
AGENT

United States Patent Office 3,498,881
Patented Mar. 3, 1970

3,498,881
APPARATUS FOR NUCLEAR REACTOR CONTROL
Ernest Siddall, Weston, Ontario, Canada, assignor to Atomic Energy of Canada Limited, Ottawa, Ontario, Canada, a corporation of Canada
Filed May 29, 1967, Ser. No. 642,101
Claims priority, application Canada, July 8, 1966, 964,966
Int. Cl. G21c 7/22, 7/06, 9/02
U.S. Cl. 176—86
2 Claims

ABSTRACT OF THE DISCLOSURE

Almost instantaneous reactor shut down is achieved by reducing the gas pressure within a hollow duct disposed within the core of a nuclear reactor such that a neutron absorbing liquid "ink" is quickly released into the duct. Slow controlled start-up is achieved by slowly pumping the ink from the hollow duct back into a reservoir located above the duct but not within the reactor core.

---

This invention relates to an improved apparatus for controlling a nuclear power reactor and more specifically to an apparatus for shutting down and starting up a nuclear power reactor.

As is well known, in order to shut down a nuclear power reactor, a neutron absorbing material may be inserted into the core of the reactor. Such neutron absorbing material absorbs neutrons and thereby prohibits the sustaining chain reaction from continuing; it may be a solid such as neutron absorbing rods or a liquid. A neutron absorbing liquid shall be referred to herein as "ink."

For safety reasons, to prevent an excursion, it may be necessary to shut down a reactor quickly. In such circumstances, it has been found advantageous to dump ink into the core of the reactor as more particularly disclosed in my Canadian Patent No. 783,668 issued Apr. 23, 1968. In using a liquid ink to shut down a reactor, unlike present mechanical methods, the accurate manufacture and alignment of parts such as control rods, is not necessary. Further the tubes and conduits in a liquid ink system can be bent and formed to facilitate shielding of the reactor core. Moreover, a liquid ink system permits a reactor shut-down time in the order of three seconds as well as easy control of the reactor during the delicate start-up operation where it is necessary to reach criticality and yet not enter an excursion.

It is an object of this invention to provide a method which permits fast shut down of the reactor.

And it is a further object to provide a reactor with means for slow controlled start-up.

I have found that this may be achieved by an apparatus comprising:

(a) A U-shaped conduit means disposed within the core of a nuclear reactor;
(b) A reservoir communicating with one end of said U-shaped conduit means and vertically disposed thereto and exterior to said core;
(c) A neutron absorbing liquid in said reservoir;
(d) Means restraining said liquid in said reservoir;
(e) Means for releasing said liquid into said U-shaped conduit means to thereby shut down said reactor.

My invention further contemplates means to slowly remove said ink from said U-shaped conduit means.

An embodiment of the invention will now be described reference being had to the accompanying drawing wherein:

The figure is a schematic representation in cross-section of a control device.

A reservoir 10 containing ink 11 has a lower chamber 12 communicating therewith through float valve 13. The lower chamber 12 is connected to a dump port 14. The dump port 14 and the surface 15 of ink are within the exterior upper shielding 16 of the reactor. One end of U-shaped conduit 17 communicates with dump port 14. The conduit 17 is disposed so that the arms thereof lie in the core of the reactor as shown. A controlling restricted flow return tube in the form of a small bore tube 18 having an inside diameter of typically ⅜" interconnects conduit 17 with reservoir 11 through lift pump 19. The oher end of conduit 17 communicates with flow tube 22 through float valve 23, trip valve 24, into the top of reservoir 10. Small bore pressure supply pipes 25 and 26 respectively communicate with pipe 22 on the opposite sides of trip valve 24. A small inter-arm connecting tube 27 communicates with the upper arms of the U-shaped conduit tube 17. A gas medium such as helium occupies along with the ink the space within the reservoir, conduit, and flow tube circuit. The ink is maintained in the reservoir 10 because of the excess pressure (typically 30 p.s.i.) within conduit 17. When it is required to shut down the reactor, trip valve 24 is opened equalizing the pressure on either side of trip valve 24; this allows ink 11 to dump into conduit 17 to thereby fill the same. As a result, the ink absorbs sufficient neutrons to reduce reactivity and preferably to make the reactor sub-critical.

When it is desired to start up the reactor again, trip valve 24 is closed and lift pump 19 started. The ink 11 is then pumped from the base of conduit 17 into reservoir 10 through small bore tube 18. Since the pipe 26 supplies gas pressure, that arm of conduit 17 which communicates with pipe 22 will be drained first until the level of the ink in that arm reaches the point of communication with the inter-arm connecting tube 27. When the ink has reached this level, the opposite arm of conduit 17 (that communicating with dump port 14) can be drained because helium will pass through tube 27; thereafter, the levels in both arms will fall equally as ink is pumped from conduit 17 into reservoir 10. The inter-arm connection obviates the possibility of one arm being slowly, continuously and completely drained prior to the irregular bubble draining of the other arm, which would occur if gas were not permitted into the arm of conduit 17 communicating with dump port 14. By having the inter-arm connecting tube disposed exterior and above the core, the arms of the conduit which lie within the core of the reactor are drained together. As is noted, the point of communication of small bore tube 18 with conduit 17 is at the lowest gravitational point of conduit 17 thereby permitting complete drainage of ink from conduit 17. The small diameter of tube 18 compels the reactor to come to criticality slowly and under effective control.

Float valves 13 and 23 permit ink and helium flow but should the ink when it is in conduit 17 tend to boil or should conduit 17 tend to collapse under external pressure the float valves will prevent the ink from being expelled from the core area. This insures positive shut down.

To ensure that float 13A of valve 13 does not block the lower chamber 12 when the ink is dumped into conduit 17, stops 28 restrain the float.

Ink level indicating tubes 20 and 21 indicate the ink level in dump port 14 and the conduit 17 by standard techniques such as gas bubbling. By placing a differential pressure indicator (not shown) across pipes 21–26 the position of the surface 15 can be ascertained. Likewise, by placing a differential pressure indicator (not shown) across pipe 20–26 the level of ink in conduit 17 may be monitored during start up of the reactor.

What I claim is:

1. In a nuclear power reactor having a reactor core, a shut down control assembly comprising:
   (a) a U-shaped conduit having a bottom portion and two upper ends, disposed within said core;
   (b) a reservoir containing a neutron absorbing ink communicating with one end of said U-shaped conduit and disposed upwardly therefrom exterior to said core;
   (c) a connecting pipe connecting said reservoir with the other end of said U-shaped conduit;
   (d) a trip valve associated with said connecting pipe, retaining said ink in said reservoir when said trip valve is in a blocking position, and releasing said ink when said trip valve is in an open position for effecting reactor shut down;
   (e) a restricted tube, connecting said U-shaped conduit with said reservoir;
   (f) pump means interconnected between said U-shaped conduit and said reservoir, removing ink from said U-shaped conduit and returning said ink slowly through said restricted tube to said reservoir, for effecting controlled reactor start up; and
   (g) pressure control means maintaining a pressure in said U-shaped conduit above that of pressure in said reservoir when said trip valve is in a blocking position.

2. The assembly of claim 1, having a one way valve associated with each upper end of said U-shaped conduit preventing the escape of ink from the core area during a shut down operation.

References Cited

UNITED STATES PATENTS

| | | | |
|---|---|---|---|
| 2,874,109 | 2/1959 | Cooper | 176—22 |
| 2,982,712 | 5/1961 | Heckman | 176—22 |
| 3,261,755 | 7/1966 | Mostert | 176—22 |

FOREIGN PATENTS

| | | |
|---|---|---|
| 1,125,562 | 3/1962 | Germany. |
| 1,206,101 | 12/1965 | Germany. |
| 923,921 | 4/1963 | Great Britain. |
| 1,269,659 | 7/1961 | France. |
| 921,447 | 3/1963 | Great Britain. |

BENJAMIN R. PADGETT, Primary Examiner

HARVEY E. BEHREND, Assistant Examiner

U.S. Cl. X.R.

176—22